Dec. 8, 1942.  R. E. COX  2,304,546
SAFETY BRAKE CONTROL MECHANISM
Filed Jan. 21, 1941  3 Sheets-Sheet 1
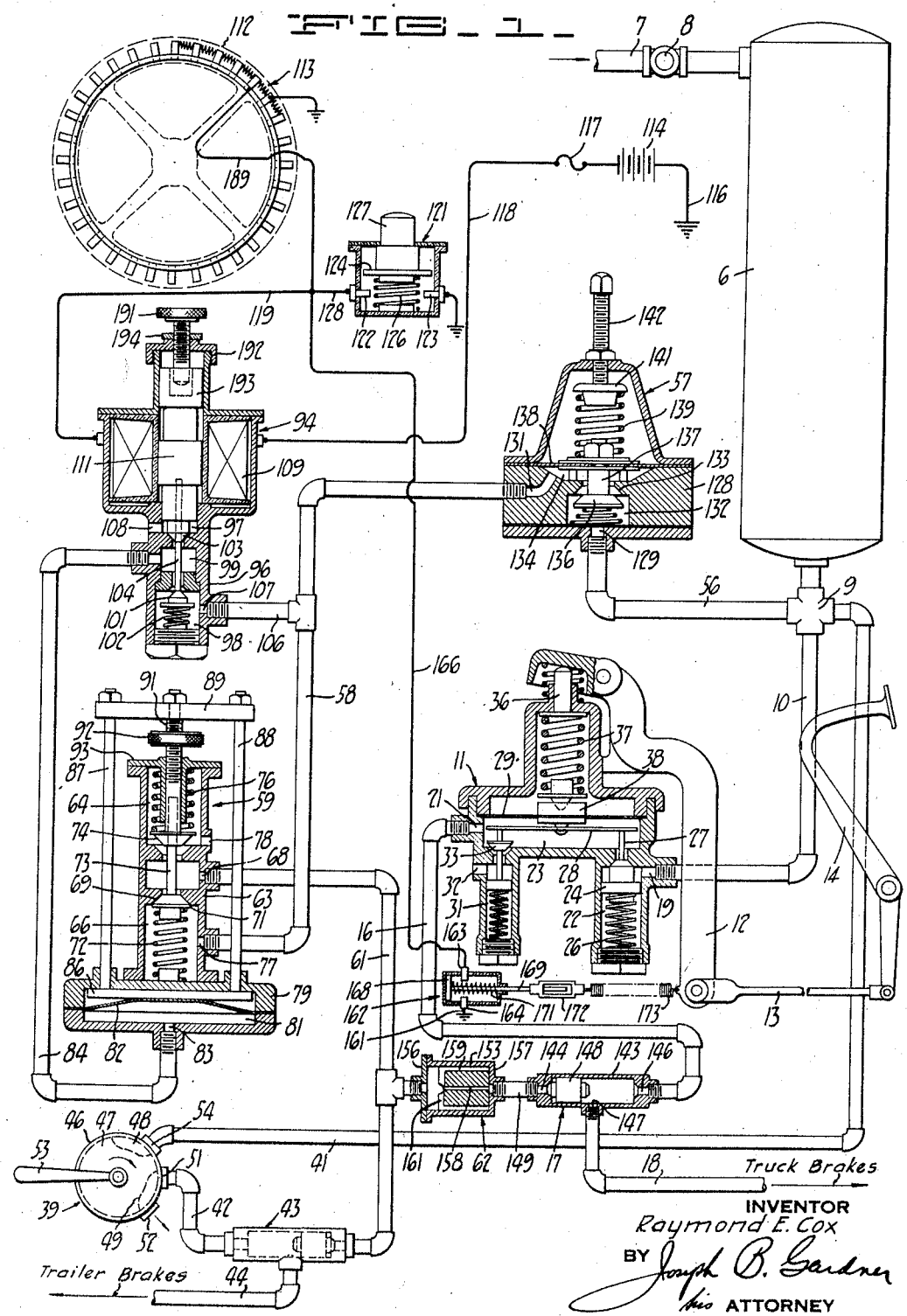
INVENTOR
Raymond E. Cox
BY
Joseph B. Gardner
his ATTORNEY Dec. 8, 1942.  R. E. COX  2,304,546
SAFETY BRAKE CONTROL MECHANISM
Filed Jan. 21, 1941  3 Sheets-Sheet 2
FIG_2_
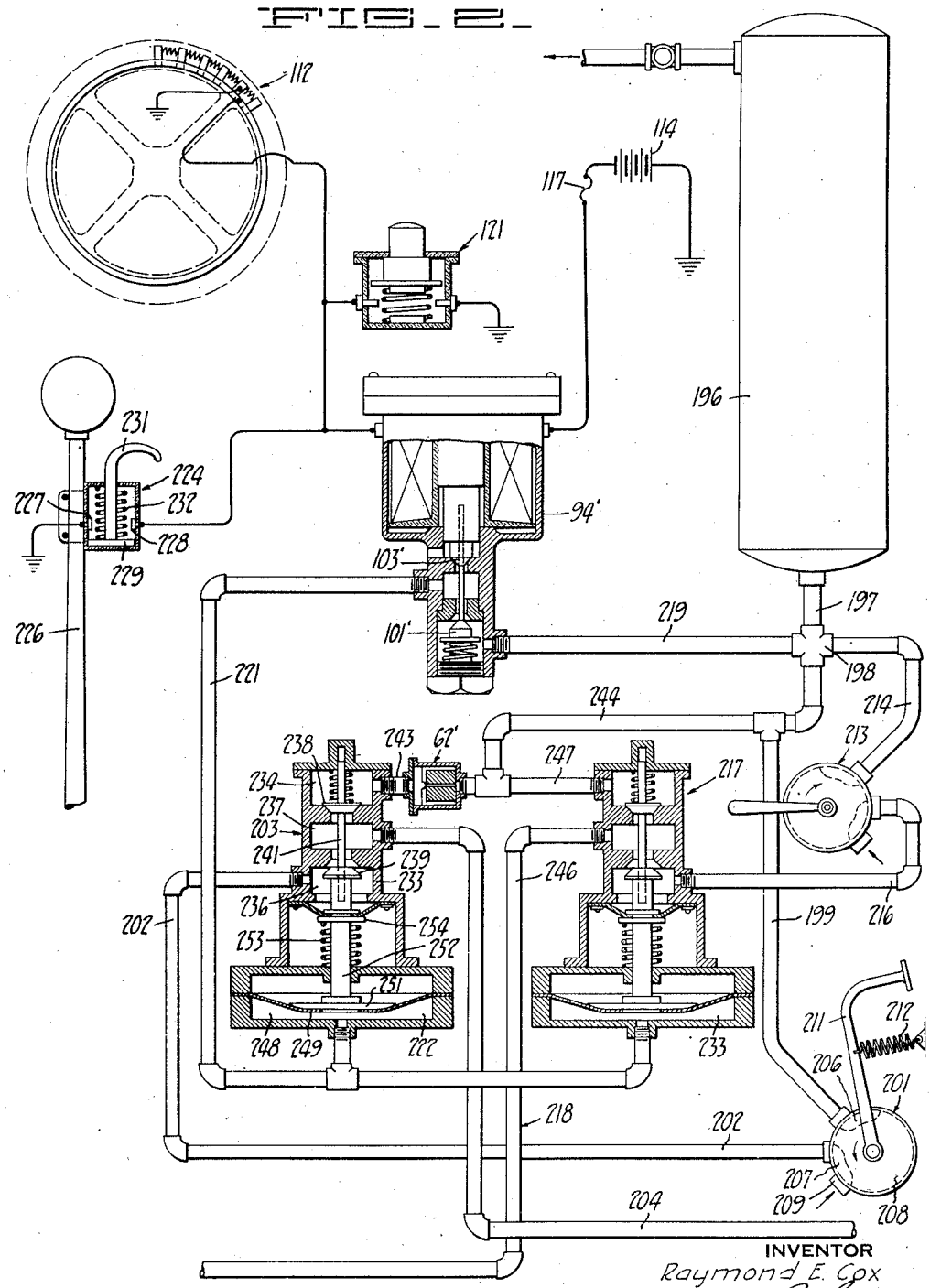
INVENTOR
Raymond E. Cox
BY Joseph B. Gardner
his ATTORNEY

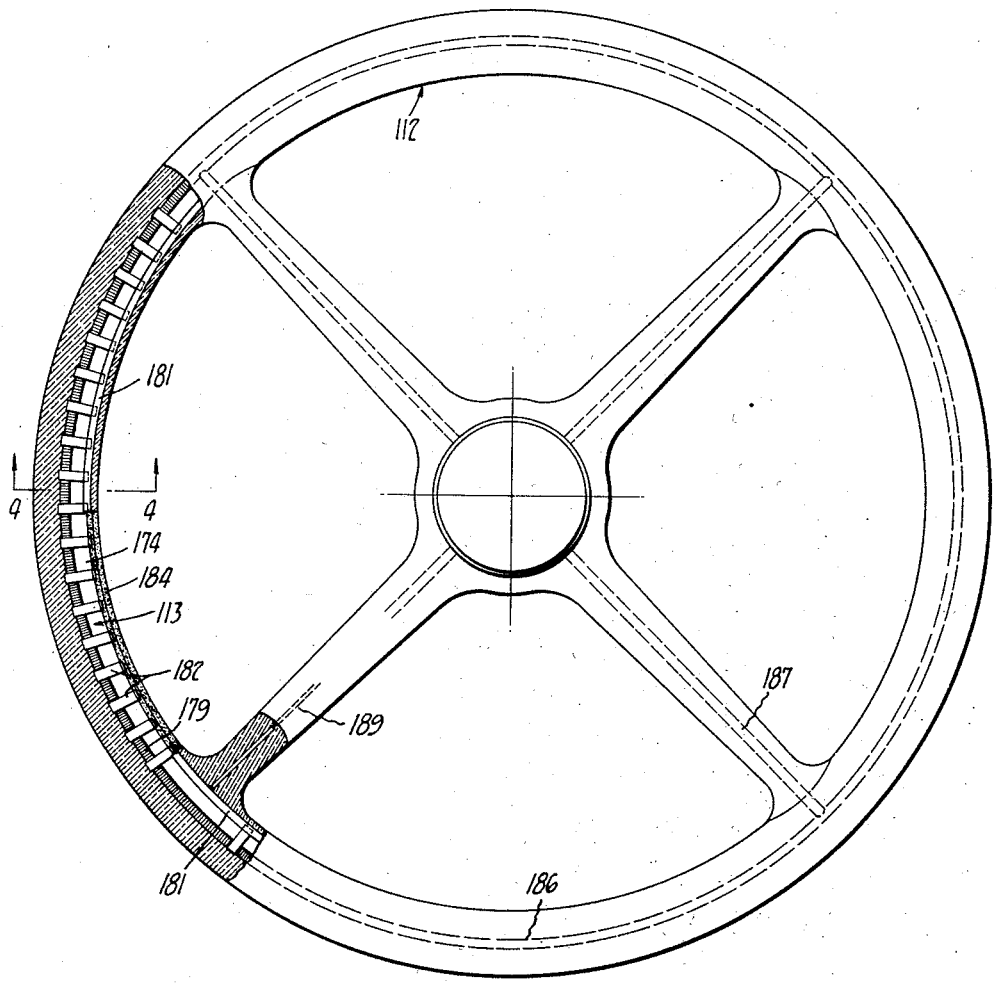
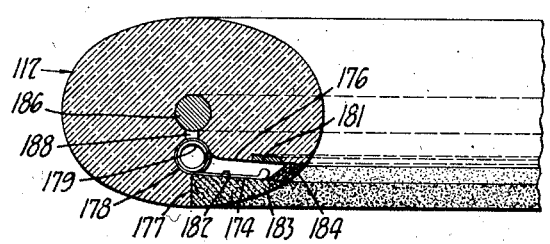

Patented Dec. 8, 1942

2,304,546

UNITED STATES PATENT OFFICE 2,304,546

SAFETY BRAKE CONTROL MECHANISM

Raymond E. Cox, Oakland, Calif.

Application January 21, 1941, Serial No. 375,216

7 Claims. (Cl. 188—110)

The invention relates to safety brake control mechanisms for automotive vehicles and trailers and the like of the type generaly disclosed by my previous Patents Nos. 2,128,916 and 2,188,200.

In the control system to which the present invention relates, the brakes of the automotive vehicle are automatically applied in the event the operator of the vehicle starts to fall asleep or otherwise momentarily lapses and releases his grip of the steering wheel, whereby the vehicle will be promptly brought to a safe stop. The mechanism utilized in the safety control consists of electrically and mechanically operated devices embodied in the pneumatic or fluid circuit of the brake assembly for the vehicle and which is in turn electrically operated by switch means carried by the steering wheel of the vehicle, the switch means being so arranged on the steering wheel that the same is automatically operated upon gripping and releasing of the wheel. In previous systems the setting into operation of the pneumatic brake mechanism was dependent upon a closing of the electric circuit by the aforementioned switch means. This feature of the system has the disadvantage that an opening of the electric circuit at any part thereof due to wear or accident, will prevent the automatic operation of the system. In accordance with the present invention and as a principal object thereof, the present system is arranged to operate upon the opening of the electric control circuit whereby positiveness of operation upon release of grip of the steering wheel will be insured.

Another important object of the present invention is to provide a system of the character described which will automatically apply the brakes of the vehicle in the event of a predetermined and inherent dangerous depletion of the fluid pressure source.

A further object of the invention is to provide a brake control system of the character above which may be readily applied to existing types of automotive vehicles and is especially designed for adaptability to truck and trailer vehicles and is operative in the latter instance to automatically simultaneously apply the brakes of both units with a retarded action in the propelling vehicle brakes to provide a smooth safe stopping of the units without "jack-knifing" or over-running of the trailer unit.

Still another object of the invention is to provide a brake control system of the character described which is adapted for use in conjunction with the usual manual foot control brake valves and while will be automatically rendered inoperative to produce an emergency stop of the vehicle when the operator is controlling the vehicle through the use of the manual or foot control brake valves.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a diagrammatic representation of a brake control system constructed in accordance with the present invention, the several operating members of the system being illustrated in cross section.

Figure 2 is a view similar to Figure 1 but showing the system modified for use with a vacuum power source.

Figure 3 is a front elevation of a steering wheel constructed in accordance with the present invention, a portion of the wheel being broken away and illustrated in section.

Figure 4 is a cross sectional view of the steering wheel illustrated in Figure 3 and is taken substantially on the plane of line 4—4 of Figure 3.

The safety brake control system of the present invention is illustrated in Figure 1 in conjunction with an air pressure brake system and includes as part thereof a reservoir 6 which is charged with compressed air or other fluid by way of an inlet conduit 7 and check valve 8 therein for maintaining the pressure in the reservoir. The reservoir is connected to a multiple outlet fitting 9 and thence by a conduit 10 to a foot control valve 11. The latter is normally opened and closed and regulated as to quantity of air flow by displacement of an operating lever 12 which is connected by link 13 to a foot pedal 14 normally positioned in the driver's compartment of the automotive vehicle. The air under pressure passes from valve 11 by way of conduit 16 to a two-way check valve 17 and thence by way of conduit 18 to the air brake chambers of the brake mechanism of the vehicle. These air brake chambers are well known in the art and therefore are not here shown. The foot control valve 11 is of more or less standard construction and fully disclosed in my prior patents aforementioned, and consists briefly of a casing having inlet and discharge passages 19 and 21 to which the conduits 10 and 16 are connected. Passage 13 opens into a valve chamber 22 adjacent the top thereof, which chamber opens to an enlarged interior pressure chamber 23. A reciprocal valve 24 is mounted in the chamber 22 and is normally elevated to a seated position by means of a helical spring 26 mounted thereunder. The valve is provided with a stem 27 which extends into the chamber 23 and into engagement with the underside of a swivel plate 28 which is fulcrumed adjacent the center thereof to the under-side of a pressure responsive diaphragm 29 mounted across the chamber 23. Means is provided for venting chamber 23 and the discharge conduit 16 to the atmosphere upon closing of valve 24 and in the present construction this means consists of a second valve chamber 31 communicated with the chamber 23 and to the atmosphere by way of a port 32. A reciprocal valve 33 is mounted in chamber 23 in position to engage and close off the top of chamber 31 and is normally held in unseated position by means of a helical spring 34 mounted in the valve chamber 31. The valve 33 is provided with an upwardly extending stem which engages the under-side of the swivel plate 28 on the opposite side of its fulcrum from the valve stem 27. Spring 34 is constructed somewhat lighter than spring 26 so that upon depression of the swivel plate 28, the latter will rock to close valve 33 before opening of valve 24. The swivel plate 28 is depressed by operation of the control lever 12 which, as will be seen, is pivoted to the casing and is engageable with the upper end of a stem 36 of a spring rest bearing against the upper end of a helical spring 37 supported on the diaphragm 29 by a supporting member 38 which extends through the diaphragm to provide the fulcrum point of plate 28. From the foregoing it will be clear that upon depression of the foot table 14, air under pressure will pass from conduit 10 into chamber 23 through open valve 24 and thence out through the discharge passage 21 and conduit 16. Upon release of the foot table, valve 24 moves to a seated position to seal off the incoming compressed air and valve 33 opens so as to vent the chamber and the discharge conduit 16 to the atmosphere.

As above indicated, the present system is arranged for application of the brake units of a trailer and as will be seen from Figure 1, the trailer brakes are normally manually operated by means of a hand valve 39 which is preferably mounted in the driver's compartment of the propelling vehicle and which receives compressed air by way of conduit 41 and is connected by a discharge conduit 42 to a two-way check valve 43 and thence by conduit 44 to the air brake chambers of the trailer. The valve 39 is here shown of a rotary type including an outer valve casing 46 and an interior rotor 47 having a pair of circumferentially spaced side ports 48 and 49. In the normal off-position of the valve, as illustrated in Figure 1, the port 49 communicates a discharge passage 51, to which the conduit 42 is connected, to an atmospheric passage 52. Upon rotation of the rotor in a clock-wise direction, as by means of handle 53, port 48 moves into registration with an inlet passage 54, to which conduit 41 is connected and discharge passage 51, so as to pass compressed air from the reservoir 6 to the trailer brake chambers.

In accordance with the foregoing, it will be clear that the operator of the propelling vehicle may by manual actuation of the foot pedal 14 and the handle 53 bring the propelling vehicle and the trailer vehicle to a stop. Ordinarily in so using the manual controls, the operator will first displace the handle 53 to set the brakes of the trailer unit prior to displacing the foot table 14 to set the brakes of the propelling unit and will in the operation of these two controls maintain a slightly greater braking force on the trailer than on the propelling unit so as to bring both units to a smooth safe stop without "jack-knifing" of the units.

The automatic control of the present invention is so designed and constructed and connected in the aforementioned fluid circuits so as to provide an automatic setting of both the trailer and the propelling vehicle brakes upon release of the steering wheel of the vehicle. As will be seen from Figure 1, compressed air for the automatic circuit is withdrawn from the multiple fitting 9 by way of a conduit 56 to a reducer valve 57 and thence by conduit 58 to a pneumatically operated valve mechanism 59 and thence by conduit 61 to the truck and trailer brake units. In order to provide a delayed operation of the brake units of the propelling vehicle, an air flow retarder 62 is connected between the conduit 61 and the two-way check valve 17 to which the propelling vehicle brake chambers are connected.

The valve mechanism 59 here consists of a valve body 63 having opposed-ended valve chambers 64 and 66 opening into an interior 67 provided with a discharge passage 68 to which the conduit 61 is connected. Mounted in the lower chamber 66 for reciprocation to and from a valve seat 69 in the top of the chamber, is a valve 71 which is normally urged to closed position by a helical spring 72 compressed thereunder and which is provided with a valve stem 73 which extends upwardly through the chamber 67 and into the chamber 64. A valve 74 is mounted in the upper chamber 64 upon the stem 73 so as to move in unison with the valve 71 and is normally urged to seated position by a helical spring 76 compressed between the top of the valve 74 and the upper end of the valve chamber 64. In accordance with the present construction, the spring 76 is of somewhat heavier construction than the spring 72 and exerts a greater force whereby the valves 74 and 71 are normally urged to a seated and unseated position respectively. The lower valve chamber 66 is provided with an inlet passage 77 to which the conduit 58 is connected so that in the open position of the valve 71, air under pressure is permitted passage from the inlet passage 77 through the interior chamber 67 and out through the discharge passage 68, to operate the brakes. On the other hand in the seated position of valve 71 and correspondingly open position of valve 74, the interior chamber 67 is communicated with valve chamber 64 which is in turn vented to the atmosphere by way of a side port 78. In this position of the valve structure, compressed air in conduit 61 may return through chamber 67 and be discharged to the atmosphere through port 78.

Displacement of valves 71 and 74 is here arranged to be effected by means of a pneumatic actuator associated with the valve structure. As will be seen from Figure 1, the valve body 63 is mounted on the top of a casing 79 which is formed with an interior air chamber 81 divided into upper and lower vertical compartments by a flexible diaphragm 82. Compressed air may be entered into the lower compartment of the chamber under the diaphragm by way of an inlet passage 83 to which a conduit 84 is connected. Mounted on the upper side of the diaphragm in the chamber is a plate 86 which supports a plurality of vertically extending push-rods 87 and 88 which extend through the top wall of the casing 79 and are connected at their upper ends by a cross member 89. An extension 91 of the valve stem 73 is secured to the cross member 89 whereby upon application of pressure in the lower chamber compartment and elevation of the plate 86, the valve members 71 and 74 will be elevated to seat valve 71 and unseat valve 74. On the other hand upon release of pressure in the lower compartment of the valve chamber, the upper spring 76 will cause a downward movement of the valves to seat valve 74 and unseat valve 71. A lock-nut 92 is preferably provided upon the stem extension 91 and which is engageable with the top wall 93 of the valve body to hold the valve in a raised position when desired against the operation of the upper spring 76.

Air pressure for controlling the operation of the pneumatic actuator as aforementioned is supplied through a solenoid or magnet valve mechanism 94 which is in turn electrically controlled from the steering wheel of the vehicle, as will be presently described. The valve mechanism 94 consists of a valve body 96 providing opposed-ended valve chambers 97 and 98 formed at the opposite sides of an interior chamber 99 communicated with each of the valve chambers. The lower valve chamber 98 is formed with a valve seat at the upper side thereof which is opened and closed by a valve 101 normally elevated to a seated position by a helical spring 102 pressed between the under-side of the valve and the lower end of the valve body. The upper chamber 97 is provided with a valve seat at the lower end thereof which is opened and closed by a valve 103 which is connected to valve 101 for joint movement of the valve by a common valve stem 104. Air under pressure is entered into the lower valve chamber 98 by way of conduit 106 connected to conduit 58 and to an inlet passage 107 in the valve body. The intermediate chamber 99 is connected to the conduit 84 leading to the pneumatic actuator and the upper valve chamber 97 is vented to the atmosphere by way of a discharge port 108. A solenoid actuator is mounted at the upper end of the valve body and includes a magnet coil 109 and a central plunger 111 which is connected to an upper extension of the valve stem 104. In the de-energized position of the coil 109, the valves 101 and 103 are elevated to a seated and unseated position respectively and in an energized position of the coil, these valves are moved downwardly to seat valve 103 and to unseat valve 101. Thus in the energized position of the solenoid valve mechanism, air under pressure passes through the solenoid valve to the pneumatic actuator to prevent the passage of compressed air to the brake units. On de-energizing the solenoid valve mechanism, air is discharged from the pneumatic actuator by way of conduit 84 and valve 103 to the atmosphere and valve 81 is opened to pass compressed air to the brake units.

As mentioned in the foregoing, control of the system and more particularly control of the solenoid actuator is here effected from the steering wheel 112 of the vehicle. The latter is so constructed to embody an electric switch means 113 in a manner providing for the operation of the switch means upon gripping and releasing of the steering wheel. In accordance with the present construction and as more clearly illustrated in Figure 4 of the drawings, the switch means assumes an open position upon release of the steering wheel and is moved to a closed position upon gripping of the steering wheel. The switch means is connected in an electric circuit including the magnet coil 109 and a source of electrical potential such as a battery 114. As will be seen from Figure 1, one side of the battery is grounded to the chassis of the vehicle by means of a conductor 116 and the opposite side of the battery is connected to a current limiting fuse 117 and thence by conductor 118 to the coil 109 and thence by conductor 119 to one side of the switch means 113, the other side of the switch means being grounded. It will thus be seen that upon gripping of the steering wheel and energizing of the solenoid actuator 93, air pressure will pass from the reservoir 6 through the solenoid actuator valve 101 to the pneumatic actuator to close valve 71 and prevent passage of compressed air to the brakes. Upon release of grip of the steering wheel and opening of the electric circuit, the application of pressure to the pneumatic actuator is interrupted and valve 71 is open to cause passage of compressed air to the brake units.

In order that the operator of the vehicle may prevent an undesired automatic operation of the braking system during moments when it is necessary to remove his hands from the steering wheel, I prefer to include a foot switch 121 in the electric circuit in parallel with the switch means 113 whereby the operator of the vehicle may engage and displace the foot switch to maintain the electric circuit closed when necessary to release his grip of the steering wheel. The switch 121 is here of a simple push type including spaced electric contact members 122 and 123 which are engaged and disengaged by a bridge contact 124 normally held out of engagement by a spring 126. The bridge contact 124 is carried by a pusher member 127 which may be engaged and depressed by the foot against the resistance of spring 126 in order to close the electric circuit through the switch. As here shown contact member 122 is connected by conductor 128 to conductor 119 while contact member 123 is grounded.

The reducer valve 57 is preferably used in the automatic control in order to prevent the sudden application of the full reservoir pressure to the brake units. In the case of the manually controlled valves, the operator can regulate the amount of pressure applied to the brakes and accordingly a reducer in the line is not necessary. The reducer valve comprises a valve casing 128 having an inlet passage 129 to which conduit 56 is connected and the discharge passage 131 to which conduit 58 is connected. Inlet passage 129 opens to a valve chamber 132 which is provided at an opposite end with a valve seat 133 which surrounds a passage opening into a chamber 134 to which the discharge passage 131 is connected. Mounted in the chamber 132 for movement to and from the seat 133 is a valve 136 having a stem 137 passing through the seat opening and secured to a diaphragm 138 mounted across the base of chamber 134. The valve is normally held in partially open position by means of a spring 139 compressed between a supporting plate at the diaphragm and a spring seat 141 at the inner end of a screw 142 threaded through the casing at the top of chamber 134. In accordance with this construction valve 136 will move in accordance with fluctuations in the pressure at the intake passage 129 to produce a substantially constant and reduced output pressure. The reduced output pressure may be controlled by adjustment of the screw 142.

The two-way check valves 17 and 43 permit the coupling of the manual controls and the automatic control to the truck and trailer brake units. These check valves are in each instance composed of elongated cylinders 143 having passages 144 and 146 opening to the opposite ends thereof and a passage 147 opening to the center of the length of the cylinder. A double ended piston valve 148 is mounted in the cylinder for end-wise reciprocation therein so as to cover and uncover the passages 144 and 146. In the case of check valve 17, conduit 16 leading from the foot controlled valve is connected to passage 146 and the opposite end passage 144 is connected by conduit 149 to the flow retarder 62 connected to the automatic control circuit. Conduit 18 leading to the truck brake units is connected to the central passage 147. In this manner when the brakes are operated by the foot control valve, compressed air enters passage 146, pushes piston 148 to the opposite end of the cylinder and passes out of passage 147 to the truck brake units. In the automatic operation, compressed air enters the cylinder through passage 144, pushes piston 148 to the opposite end of the cylinder and discharges to the truck brakes through the center opening 147. In a similar manner in the case of the double check valve 43, conduits 42 and 61 are connected to the opposite ends of the cylinder and conduit 44 leading to the trailer brake units is connected to the center passage of the cylinder.

The flow retarder 62 here used as aforementioned to cause a faster setting of the trailer brakes than the truck brakes here comprises a casing 153 providing an interior cylinder in which is mounted a reciprocating piston valve 154 adapted for movement between the opposite ends 156 and 157 of the casing. The piston valve 154 is provided with a reduced axial bore 158 therethrough which is somewhat smaller than the passage provided by the other conduit of the system so as to restrict the fluid flow from conduit 61 to the truck brake conduit 18. The device is, however, constructed to provide a rapid and unrestricted fluid flow in a reverse direction. This is effected by providing the valve 154 with a plurality of longitudinal grooves 159 in the periphery thereof, which connect with radial grooves 161 at one end of the valve which engages the end 156 of the casing. In this manner when the fluid flow is from left to right as viewed in Figure 1, the piston is displaced to end 157 of the casing and the fluid passage confined to the axial passage 158. On the other hand when the fluid flow is in a reverse direction, the piston is pressed against end 156 of the casing and in this case the fluid may pass not only through the axial bore 158 but also through the longitudinal grooves 159 and the radial grooves 161.

It is desirable that the automatic control system be rendered inoperative during any period of manual operation of the foot brake of the vehicle so that the operator when using the foot brake will have full and exclusive control of the braking system. This feature is provided in the present system by the provision of an electric switch 162 which is operatively connected for actuation to the foot pedal 14 and the foot brake valve 11 and is electrically connected across the switch means 113 at the steering wheel whereby upon advancing the brake pedal 14 the switch means 162 will be closed to retain the electric control circuit closed. As illustrated in the drawings, the switch means 162 includes a pair of electric contacts 163 and 164 which are connected by conductor 166 to conductor 119 of the electric control circuit and by conductor 167 to ground. A bridge contact member 168 is mounted on a guided stem member 169 for movement to and from engagement with contacts 163 and 164 and is normally urged out of such engagement by a spring 171. Stem 169 is connected by means of a threaded adjustment member 172 and a spring 173 to the operating lever 12 of the foot valve so that upon displacement of the valve, the switch will be moved to closed position and upon return movement of the valve the switch will automatically move to open position.

The steering wheel and electric switch combination used in the present system is best illustrated in Figures 3 and 4 of the drawings. As will be seen from Figure 4, the steering wheel 112 is provided around its entire periphery on the underside of the wheel with an annular recess 174 defined between substantially right-angularly related walls 176 and 177. At the intersection of these walls at the base of the recess is formed an annular groove 178 within which is mounted a continuous annular coil spring member 179. An annular contact ring 181 is embedded in wall 176 of the recess and a plurality of contact strips 182 are secured to the coil spring 179 at circumferentially spaced positions thereof and extend inwardly into opposed position relative to the contact ring 181 and may be displaced inwardly to engage the ring against the resilient resistance of the spring 179. An annular cover member 183 is provided for the recess 174 which is preferably made from flexible material such as rubber or the like and which is vulcanized, cemented or otherwise secured along one side thereof to side wall 177 of the recess. The opposite end portion 184 of the cover member 183 is preferably formed of a relatively soft material such as sponge rubber and engages wall 176 of the recess outwardly of the contact ring 181. As will be seen from Figure 4, the cover member 183 lies on the outside of the contact strips 182 whereby upon gripping of the wheel by the operator, the cover member 183 may be compressed inwardly to close the electric contact members. Since all of the contact strips 182 are electrically connected to the spring 179 and since the ring 181 provides a continuous annular contact member, a movement of any of the contact strips into engagement with the ring 181 will close the electric circuit. Preferably, a metal reenforcing ring 186 is provided in the body of the steering wheel 112 and is joined with a plurality of metal reenforcing members 187 extending through the spokes of the steering wheel to the central hub thereof. Since the core members 186 and 187 are normally electrically grounded to the chassis of the vehicle, I prefer to electrically connect the coil 179 to the core ring 186 to facilitate electrical connection of the switch contact members. This is here effected by a short electrical connector 188 extending between the spring 179 and the core 186. An electrical connector 189 is extended through one of the spokes of the steering wheel to engage the contact ring 181.

It will be clearly understood from the foregoing that upon gripping of the steering wheel and closure of the electric control circuit, the automatic brake control means is held in check to be placed in operation upon opening of the electric control circuit. Normally of course the control circuit is opened and closed only by operation of the steering wheel switch means 112 or the foot switch 121 or the switch means 162 associated with the foot control brake pedal. However, an opening of the electric control circuit at any point due to wear, corrosion or faulty electric connection or the like will cause the brakes to be set, thus positively insuring proper maintenance of the electric control circuit and proper operation thereof when required for emergency stops or other stops made by the operator by the switch control means 113.

Another important feature of the present control system and as mentioned in the objects of the invention, is the automatic setting of the brakes upon partial depletion of the air pressure in the reservoir 6. As will be appreciated, one of the most hazardous and dangerous features of a pneumatic brake system is the possibility of air leakage in the system or partial or complete failure of the compressor to adequately supply compressed air to the reservoir. In the present construction a drop of reservoir pressure will cause an immediate response at the pneumatically operated valve mechanism 59 to cause a setting of the brakes. As will be noted from the drawings, the reservoir pressure as reduced by reducer valve 57 is applied to diaphragm 82 to normally close valve 71 which controls the flow of air to the brakes. Upon reduction of this air pressure, the diaphragm will be forced downwardly by spring 76 to open valve 71 and thereby permit passage of compressed air from conduit 58 through valve 71 to conduit 61 and to the brake lines. This automatic operation is hastened due to the fact that upon partially opening valve 71, and prior to closing of the upper valve 74, compressed air may discharge to the atmosphere through port 78 until the pressure has been reduced sufficiently to cause a seating of valve 74 and a full opening of valve 71. Due to the bleeding action thus provided, the pressure change for operating the control mechanism will be hastened.

Means is also preferably provided for taking the automatic control system out of operation when the vehicle is out of operation, such as when garaged and the like. For temporary stops it is in most instances desirable that the brakes of the vehicle be set as soon as the operator releases the steering wheel and remains set while the oprator is away from his compartment. Where, however, it is desired to prevent operation of the brakes of the control system during absence of the driver from the vehicle, I provide means on the magnet valve for mechanically holding the latter in an energized position. This means, as illustrated in Figure 1 of the drawings, consists of a set-screw 191 which is threaded through a cap 192 at the top of the magnet valve casing to engage and depress a bearing block 193 on the upper end of the plunger 111. By this means, the operator may by screwing down the set-screw 191, mechanically open and hold open magnet valve 101 to maintain an air pressure in the pneumatic actuator for valve mechanism 59 to seal off the air pressure from the brake lines. A lock nut 194 is preferably provided on the set-screw 191 for holding the latter in adjusted position. Where longer stopovers are made and for other reasons which may occur, such as repair of parts of the system, etc., nut 92 of the valve mechanism 59 may be used to effect a similar purpose.

A modified form of the invention has been illustrated in Figure 2 of the drawings, wherein the control system is shown operatively applied to a vacuum or sub-atmospheric pressure brake system. In this form of the invention a sub-atmospheric source 196 is connected by conduit 197 to a multiple outlet fitting 198 and thence by conduit 199 to a foot-controlled valve 201, thence by conduit 202 to a master valve 203 and thence by conduit 204 to the truck or propelling vehicle brakes. Valve 201 is here composed of a simple rotary two-way type having ports 206 and 207 in the rotor 208 thereof which are spaced on the periphery of the rotor to move into and out of engagement with ports connected to conduits 199 and 201 and a port 209 which is open to the atmosphere. In the inoperative position illustrated conduit 202 is vented to the atmosphere and conduit 199 is sealed by the rotor. A brake pedal 211 is connected to the rotor and when depressed to rotate the rotor in a counter clockwise direction advances port 206 to simultaneously register with conduits 109 and 202. A spring 212 connected to the foot lever 211 normally holds the latter in the inoperative position shown. The trailer brake units are operated manually by hand valve 213 which is similar in construction to the hand valve 39 illustrated in connection with the first described embodiment of the invention and which is here connected to the reservoir 196 by conduit 214 and is connected by conduit 216 to a master valve 217, the fluid circuit being thence completed to the trailer brakes by conduit 218. The automatic operation is in this instance also controlled by a solenoid valve mechanism 94' which is connected to the sub-atmospheric source 196 by conduit 219 and is connected by conduit 221 to two pneumatic actuators 222 and 223 for the master valves 203 and 217 respectively. The electric circuit for controlling the operation of the solenoid valve 94' is the same as in the first described embodiment of the invention and includes the foot switch 121, steering wheel switch means 112, the fuse 117 and the battery 114. A switch means 224 carried by a gear shift lever 226 has been added to the electric circuit for this embodiment. This switch means is equally applicable to the electric control circuit illustrated in Figure 1. In certain types of trucks, two transmission mechanisms are used for increasing the number of available gear ratios, and in such instances, it is sometimes necessary that the operator of the vehicle use both hands and both feet in shifting gears, the hands being applied to the gear shift levers and one foot being applied to the clutch pedal of the vehicle, and the other foot being applied to the gas throttle to control the engine speed for shifting gears of both transmissions substantially simultaneously. In such case there is no opportunity of using the foot switch 121 and accordingly the switch 224 is operatively mounted upon one of the transmission gear shift levers so as to maintain the electric control circuit closed during the shifting operations. This switch means here consists of a pair of electric contact members 227 and 228 which are engaged and dis-engaged by a bridge contact member 229 mounted on a guided stem 231 forming a handle for displacing the member. A spring 232 normally urges the bridge member 229 to a dis-engaged position. The handle 231 is preferably positioned adjacent to the top of the gear shift lever 226 and may be engaged by the hand of the operator in operating the lever to elevate the bridge contact member 229 to close the electric circuit.

The electric switch means 162 illustrated in the first embodiment in conjunction with the foot pedal is preferably also used in the present embodiment for maintaining the control circuit closed during manual operation of the brake system.

The master control valves 202 and 217 are of identical construction and are similar in construction to valve mechanism 59 of the first embodiment. Each of these master valve mechanisms includes a valve body 233 providing the opposed-ended valve chambers 234 and 236 at opposite sides of an intermediate chamber 237. Valves 238 and 239 are mounted in the chambers 234 and 236 and are connected by a common valve stem 241 for simultaneous movement, the arrangement being such that upon elevation of the valves, valve 239 moves to a seated position and valve 238 moves to an open position and upon downward movement of the valves, valve 238 seats while valve 239 moves to open position. In the case of valve 203, the lower chamber 236 is connected to conduit 202 before-mentioned leading to the foot control valve 201. The intermediate chamber 237 is connected by conduit 204 aforementioned to the propelling vehicle brake units. The upper chamber 234 is connected by conduit 243 to a flow reducer 62' of the type described in connection with the first embodiment and thence by conduit 244 to the sub-atmospheric source 196. In the case of master valve 217, the lower valve chamber is connected to conduit 216 leading to the hand valve 213 aforementioned, the intermediate chamber is connected by conduit 246 to the brake units of the trailer, and the upper chamber is connected by conduit 247 to the source conduit 244.

Actuation of the master valves 203 and 217 is controlled by the pneumatic actuators 222 and 223 in a manner similar to that described in connection with the first embodiment. Each of these actuators include an air chamber 248 having mounted thereacross a flexible diaphragm 249 operatively connected by a plate 251 and a stem 252 to the valve stem 241 aforementioned. Normally the valves 238 and 239 are urged to an upward position by means of a coil spring 253 mounted in a chamber above the chamber 248 and compressed against a spring seat 254 on the stem member 252. In operation the under valve of chamber 248 is evacuated by connection thereof to conduit 221 leading to the solenoid valve whereby the diaphragm 241 is drawn downwardly and valves 238 and 239 move to a seated and unseated position respectively.

The operation of the vacuum system will be clear from the foregoing and may be summarized as follows. In the closed position of the electric control circuit, solenoid valve mechanism 74' is energized so as to open valve 101' and close valve 103' thereof. In such position conduits 219 and 221 are communicated so as to evacuate the pneumatic chambers 248 of the master valves 203 and 217 to thereby cause a seating of valves 238 thereof and an opening of valves 239 thereof. In this position of the master valves, conduits 204 and 218 leading to the truck and trailer brake units are communicated to the atmospheric ports of the foot and hand valves through the master valves. Upon release of the steering wheel, the solenoid is de-energized and the valves 101' and 103' moved to reverse positions from those above described, thereby cutting off the source of reduced pressure and supplying atmospheric air pressure to the pneumatic actuators 222 and 223, which in turn permits an elevating of the valve assemblies by springs 253 of the master valves. In such case, sub-atmospheric pressure is communicated to the vehicle brake lines by way of conduit 244, reducer 62', and through the upper and intermediate chambers of master valve 203, and sub-atmospheric air is communicated to the trailer brake units through conduit 244, conduit 247 and the upper and intermediate chambers of master valve 217.

It will be noted in connection with the vacuum operation, that the same safeguards against accidental opening of the electric circuit and against depletion of the air power source as in the case of the first embodiment. A partial depletion of the vacuum source will cause pneumatic actuators 222 and 223 to operate to communicate the source with the truck units as described in connection with the first embodiment. Also it will be noted that the full force and effect of the vacuum source is communicated to the brake lines during automatic operation rather than a reduced portion thereof as in the case of the pressure system.

In both of the operating circuits illustrated in Figures 1 and 2, the solenoid is illustrated in an energized position for clarity of operation and accordingly it is to be considered that in these two views, the electric switch means 112 or one of the other electric switches in the circuit, is closed.

While both of the systems illustrated in Figures 1 and 2 are adapted for use with both the truck and trailer units, it will be clear that the systems may be simplified for sole use with a truck, where a trailer is not used, by deleting the conduits and valve incorporated in the trailer fluid circuit. In the case of the pressure system illustrated in Figure 1, such deletion would include the hand valve 39, the two-way check valve 43, the retarder device 62 and the connecting conduits. In the case of the vacuum operated system illustrated in Figure 2, such deletion would include hand valve 213, the master valve 217, the flow retarder 62' and the connecting conduits.

I claim:

1. In a safety brake control mechanism for automotive vehicles having fluid pressure operated brake mechanisms and including a fluid power source and a steering wheel and electric switch means carried by said wheel and manually operated upon gripping and releasing of the wheel and an electric control valve connected in a fluid circuit between said source and said brake mechanisms and in an electric circuit with said switch means for providing fluid communication of said source with said brake mechanisms upon release of said steering wheel and to disconnect said source and brake mechanisms upon gripping of said steering wheel, a pressure responsive valve means in said fluid circuit operative to communicate said source and brake mechanisms upon a pre-determined depletion of said source.

2. In a safety brake control mechanism for automotive vehicles having fluid pressure operated brake mechanisms and including a fluid power source and a steering wheel and electric switch means carried by said wheel and manually operated upon gripping and releasing of the wheel, the combination of an electrically controlled valve and a pressure responsive valve connected in a fluid circuit between said source and said brake mechanisms and connected in an electric circuit with said switch means and functioning to disconnect said source and said brake mechanisms upon gripping of said wheel and to communicate said source with said brake mechanisms upon release of said wheel and/or upon a predetermined depletion of said source.

3. In a safety brake control mechanism for automotive vehicles having fluid pressure operated brake mechanisms and including a fluid power source and a steering wheel and electric switch means carried by said steering wheel and manually operated upon gripping and releasing of the wheel, valve means connected between said source and brake mechanisms, resilient means urging said valve means to open position, pneumatic means for closing said valve means against the action of said resilient means, an electrically controlled valve connected between said source and said pneumatic means and connected in an electric circuit with said switch means and functioning upon gripping of said wheel to communicate said source and pneumatic means to close said valve means and functioning upon releasing of said wheel to disconnect said source and pneumatic means to thereby cause an opening of said valve means under the action of said resilient means to communicate said source and brake mechanisms.

4. In a safety brake control mechanism for automotive vehicles having fluid pressure operated brake mechanisms and including a fluid power source and a steering wheel, electric switch means carried by said steering wheel and manually closed and opened upon respectively gripping and releasing of said wheel, a valve spring pressed to open position connected between said source and said brake mechanisms, a pneumatic actuator connected to said valve for closing same, a solenoid valve spring pressed to closed position connected between said source and said actuator and connected in an electric circuit with said switch means and constructed to open upon closing of said circuit.

5. In a safety brake control mechanism for automotive vehicles having fluid pressure operated brake mechanisms and including a fluid power source and a steering wheel, electric switch means carried by said wheel and manually closed and opened upon respectively gripping and releasing of said wheel, an electrically controlled fluid valve means connected in a fluid circuit between said source and said brake mechanisms and connected in an electric circuit with said switch means and constructed and operated to disconnect said source and brake mechanisms upon gripping of said steering wheel and to communicate said source and brake mechanisms upon release of said steering wheel, said fluid valve means including as part thereof a solenoid operated valve normally spring pressed to closed position and displaced to open position upon energizing of the solenoid therefor, and manually operated means for locking said last named valve in open position.

6. In a safety brake control mechanism for automotive vehicles having pneumatic brake mechanisms and a source of air under pressure and a steering wheel, electric switch means carried by said steering wheel and manually closed and opened respectively upon gripping and releasing of said wheel by the operator of the vehicle, a pneumatically operated valve normally spring pressed to open position and connected in a fluid circuit between said source and said brake mechanisms, a pneumatic actuator for said valve connected thereto for displacement of said valve to closed position upon application of air pressure to said actuator, a valve normally spring pressed to closed position connected between said source and said pneumatic actuator, a solenoid actuator connected to said last named valve for displacement of the latter to open position upon energizing of said solenoid actuator, said solenoid actuator being connected in an electric circuit with said switch means and being respectively energized and de-energized upon gripping and releasing of said wheel.

7. In a safety brake control mechanism for automotive vehicles having pneumatically operated brake mechanisms and a sub-atmospheric air pressure source for operating said mechanisms and a steering wheel, electric switch means carried by said steering wheel and manually closed and opened respectively upon gripping and releasing of the wheel by the operator of the vehicle, a valve normally spring pressed to open position connected between said source and said mechanisms, a pneumatic actuator connected to said valve and operative upon application of sub-atmospheric pressure to said actuator to close said valve, a second valve connected between said source and said pneumatic actuator and normally spring pressed to closed position, and a solenoid actuator for said second valve operative upon energizing of said solenoid actuator to open said second valve and being connected in an electric circuit with said switch means whereby said solenoid actuator is respectively energized and de-energized upon gripping and releasing of said steering wheel.

RAYMOND E. COX.